US006961561B2

(12) United States Patent
Himmel et al.

(10) Patent No.: US 6,961,561 B2
(45) Date of Patent: Nov. 1, 2005

(54) ENHANCING/LIMITING USE OF MOBILE ELECTRONIC DEVICES

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 10/047,005

(22) Filed: Jan. 16, 2002

(65) Prior Publication Data

US 2003/0134627 A1 Jul. 17, 2003

(51) Int. Cl.[7] .................................................. H04Q 7/20
(52) U.S. Cl. ...................... 455/419; 455/456.1; 455/420
(58) Field of Search ............................... 455/418, 419, 455/420, 456.1

(56) References Cited

U.S. PATENT DOCUMENTS

| 5,778,304 | A | | 7/1998 | Grube et al. | |
|---|---|---|---|---|---|
| 5,877,882 | A | | 3/1999 | Green et al. | |
| 5,938,721 | A | | 8/1999 | Dussell et al. | |
| 6,119,186 | A | | 9/2000 | Watts et al. | |
| 6,122,486 | A | | 9/2000 | Tanaka et al. | |
| 6,128,485 | A | * | 10/2000 | Mori et al. | 455/422.1 |
| 6,148,212 | A | * | 11/2000 | Park et al. | 455/456.1 |
| 6,195,529 | B1 | | 2/2001 | Linz et al. | |
| 6,198,931 | B1 | | 3/2001 | Smith et al. | |
| 6,643,517 | B1 | * | 11/2003 | Steer | 455/456.4 |
| 6,694,143 | B1 | * | 2/2004 | Beamish et al. | 455/456.1 |
| 6,721,542 | B1 | * | 4/2004 | Anttila et al. | 455/68 |
| 6,760,581 | B2 | * | 7/2004 | Dutta | 455/414.1 |

FOREIGN PATENT DOCUMENTS

| DE | 197 44 263 C1 | 5/1999 |
|---|---|---|
| GB | 2 313 265 A | 11/1997 |
| JP | 10145864 | 5/1998 |
| WO | WO 99/18745 | 4/1999 |
| WO | WO 01/08387 A1 | 2/2001 |
| WO | WO 01/45064 A1 | 6/2001 |

* cited by examiner

*Primary Examiner*—Erika A. Gary
(74) *Attorney, Agent, or Firm*—Mark S. Walker; Streets & Steele; Frank J. Campigotto

(57) ABSTRACT

The present invention provides a method for a central control computer, located within a given environment, to wirelessly communicate with, control and enhance the use of various mobile electronic devices entering the given environment. These devices each possess a wireless transceiver. The central control computer transmits a discovery signal and control message to these mobile electronic devices within the range of the wireless transmissions. This allows discovery of the central control computer by the mobile electronic device and, after setting up a communication, the mobile electronic device disables one or more of its features as instructed by the central control computer. Furthermore, enhancements are provided by making available substitute features for the features of the mobile electronic device that were limited or disabled and by making available features not contained within the mobile electronic device itself.

33 Claims, 12 Drawing Sheets

ENHANCING/LIMITING USE OF MOBILE ELECTRONIC DEVICES

BACKGROUND OF THE INVENTION

1. Field of the Invention

The present invention relates to methods for enhancing and/or limiting the use of mobile electronic devices in a certain environment or location

2. Description of the Related Art

Improvements to mobile electronics devices, such as portable CD players, cellular telephones and handheld computers, have led to their widespread use without regard for their location. The convenience of taking and using these mobile electronics devices almost anywhere is very enabling, but there are times and places where the use of such devices is inappropriate or dangerous. Warning signs and announcements are typically used to instruct users to turn these devices off in restricted areas, but compliance with these instructions is primarily left to the user.

Examples of areas where the use of mobile electronic devices is inappropriate include concert halls, movie theatres, and libraries. Examples of areas where the use of mobile electronic devices is dangerous include aircraft, hospitals, and automobiles. While self-policing of usage restrictions has been the primary means for limiting the use of these devices, there have been a few attempts to impose restrictions on the use of these mobile electronic devices.

Tanaka et al. (U.S. Pat. No. 6,122,486; Sep. 19, 2000) discloses a transmission restricting system using magnetic field variations other than a prohibited radio wave frequency at an entrance/exit to a radio-wave transmission-prohibited area to restrict use of the radio equipment while located within the area.

Linz et al. (U.S. Pat. No. 6,159,529; Feb. 27, 2001) discloses a transmission blocker that generates an interference signal strong enough so that the receiving power is no longer greater than the minimum receiving power necessary.

Grube et al. (U.S. Pat. No. 5,778,304; Jul. 7, 1998) discloses a system where a communication unit includes a GPS receiver and transmits location information so that a resource controller can determine whether the communication unit is located within a predefined area of transmission restriction. Consequently, the resource controller can automatically control accessibility to communication services.

The problem with these approaches is that the user of the mobile electronic device is presented with no alternatives to the imposed constraints and thus becomes frustrated or annoyed by being denied the full use of the user's mobile electronic device. What is needed is an enhancement capability that allows a user of a mobile electronic device to maximize the features of the mobile electronic device while still maintaining the constraints imposed within an environment for safety purposes or to avoid being discourteous or annoying to those around the user.

SUMMARY OF THE INVENTION

The present invention provides a method for controlling and enhancing the use of wireless electronic devices within a given environment comprising transmitting a wireless control message within the given environment from a central control computer, establishing a wireless communication link between the control computer and a mobile electronic device upon the mobile electronic device entering the environment and receiving the control message, communicating instructions from the central control computer to the wireless electronic device to disable one or more of features within the wireless electronic device; and communicating instructions from the central control computer to the wireless electronic device to provide the mobile electronic device with access to one or more features associated with the central control computer. The one or more features associated with the central control computer are substitutes for the one or more disabled features within the wireless electronic device and may be selected from a wireless transceiver, a global positioning system, antenna, speaker, microphone, printer, display screen, keyboard, voice response, databases, spreadsheets, computer games, video games, processing power, word processing, maps, directions or combinations thereof. The one or more features associated with the central control computer may also include enhancements to the mobile electronic device, wherein the enhancements provide one or more features not possessed by the mobile electronic device.

The features within the mobile electronic device are selected from keypad, keyboard, display, speaker, microphone, transceiver, joystick, memory, transmitter, receiver, electronic flash, drivers for peripheral devices, printer, scanner or combinations thereof. The features within the mobile electronic device, on a broader scale, are selected from user input devices, user output devices, transmitter, receiver, memory, transceiver, I/O controller, drivers for peripheral devices or combinations thereof.

The mobile electronic devices used in the present invention are selected from a mobile telephone, a handheld personal computer, a personal organizer, a palmtop computer, a computerized notepad, a global positioning system (GPS), an electronic video game player, a video player, an MP3 audio player, a personal digital assistant, digital camera, video recorders, audio recorders or combinations thereof. Each of these devices has a wireless transceiver that transmits and receives wireless signals selected from radio frequency and infrared.

The present invention may be implemented in a given environment selected from, for example, aircraft, hospital, automobile, museum, library, movie theater, concert hall, stage theater, amusement park, taxi, train, restaurant, sports arena, shopping mall and office building. The given environment may be defined as the area in which the wireless control message transmission can be received by the mobile electronic device.

The wireless control message from the central control computer contains requests, or otherwise prompts the mobile electronic device to provide, information describing the mobile electronic device, addresses for the features of the mobile electronic device, an address for the mobile electronic device and combinations thereof.

The step of establishing a wireless communication link further comprises receiving the wireless control message by the mobile electronic device, interpreting the control message to be an identification request from the central control computer, and transmitting a wireless identification message to the central control computer, wherein the wireless identification message contains information describing the mobile electronic device, an address for the mobile electronic device, and an address for each of the features within the electronic device The step of establishing a wireless communication link further comprises storing the address for the mobile electronic device, and the address for each of the features within the mobile electronic device, monitoring by the mobile electronic device for messages to the assigned address for the mobile electronic device, and monitoring by the central control computer for messages from the assigned address for the mobile electronic device. Each of the messages to and from the assigned address for the mobile electronic device comprises the address for the mobile electronic device and/or the address for the one or more features of the mobile electronic device, along with an instruction for the one or more features of the mobile electronic device to perform.

The step of providing the wireless electronic device with access to one or more features associated with the central control computer further comprises receiving a message from the mobile electronic device, comparing the address for the feature of the mobile electronic device contained in the message with the list of addresses for the features of the mobile electronic device included in the wireless identification message, and instructing a substitute feature of the central control computer to perform the instruction contained in the message.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
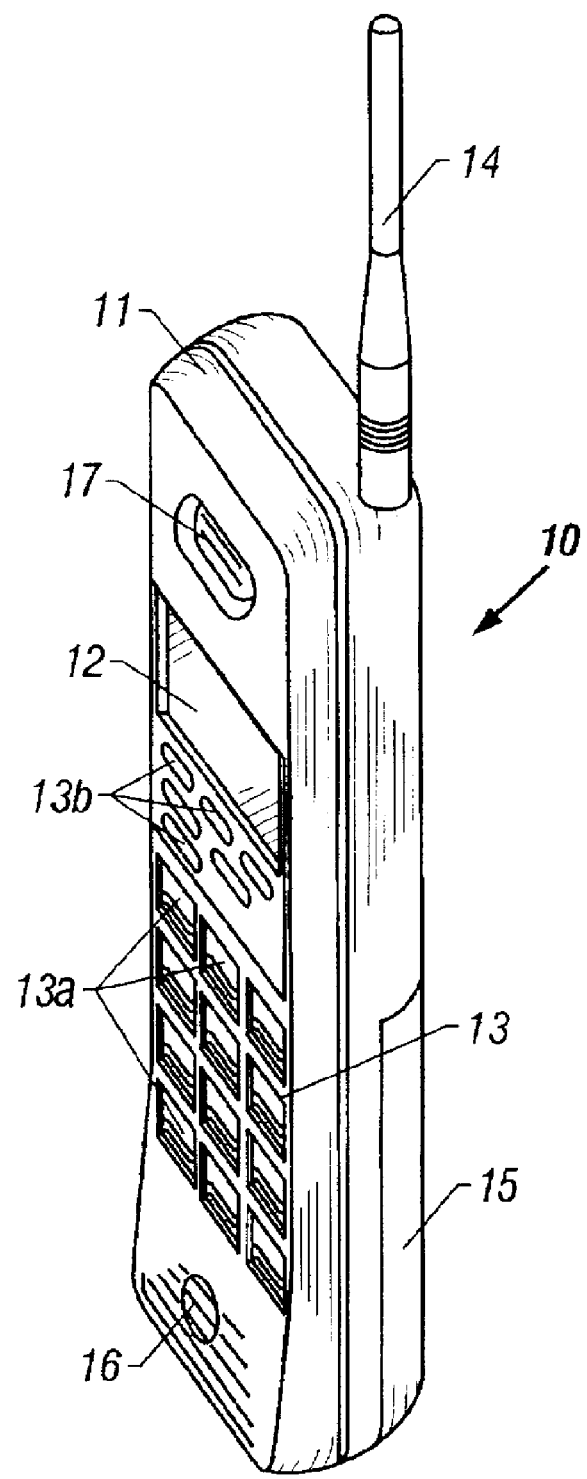
FIG. 1 is an example of a mobile telephone suitable for use in accordance with the present invention.

The present invention provides a method for a central control computer that is located within a given environment, to wirelessly communicate with, control and enhance the use of various mobile electronic devices entering the given environment. The mobile electronic devices of the present invention each possess a wireless transceiver. The central control computer transmits a discovery signal and control message to mobile electronic devices within the range of the wireless transmissions. This allows the central control computer to discover the mobile electronic device when it enters the given environment. In effect, the central control computer is an Electronic Device Control System (EDCS) that takes control of some or all aspects of the mobile electronic devices when they enter the given environment.

The given environment may be a wide range of areas, examples being aircraft, hospitals, automobiles, museums, libraries, movie theaters, concert halls, stage theaters, amusement parks, taxis, trains, restaurants, sports arenas, shopping malls, office buildings and the like. Examples of mobile electronic devices may be mobile telephones, global positioning systems (GPS), personal digital assistants, video recorders, digital cameras, video games, laptop computers, personal organizer, laptop computers and the like. These mobile electronic devices are reconfigured, after receiving the discovery and control message from the central control computer, for immediate use as slaves to the central control computer, which gains limited control or management over the use of features in the mobile electronic devices, such as limiting the use of the flash on an digital camera or limiting the recording capabilities of a video or audio recorder. The present invention further provides enhancements to the mobile electronic device by making available substitute devices that provide the same features as the features of the mobile electronic device that were limited or disabled and by making available features of the central control computer that were never contained within the mobile electronic device itself. Examples of these enhancements may be a wireless transceiver, a global positioning system (GPS), antenna, speakers, microphone, printer, display screen, keyboard, keypad, voice response, databases, spreadsheets, computer games, processing power, maps, directions and word processing.

The present invention is not limited to having just one mobile electronic device being controlled by the central control computer in the given environment. Because the connections between the central control computer and the mobile electronic devices are wireless, it is possible for the central control computer to control a plurality of mobile electronic devices. Furthermore, this control may be accomplished without additional cables and without expensive hardware such as a multipath I/O. The controlling of mobile electronic devices is accomplished simply by providing contention management with the interrupt controller and the operating system software of the central control computer.

FIG. 1 is an illustration of a mobile telephone that may be used in the present invention. While much of the following description is directed to mobile telephones in communication with a central control computer in the given environment, the invention lends itself equally to other devices, such as handheld personal computers, personal organizers, palmtop computers, computerized notepads, global positioning systems (GPS), electronic video games, video players, MP3 audio players, personal digital assistants, audio recorders, video recorders, digital cameras, audio players and the like.

The mobile telephone 10 has a casing 11, an LCD (liquid crystal display) 12 and an antenna 14 for transmitting signals to and from a mobile telephone network. These signals include audio streams and computer readable files or instructions, such as, for example, e-mail through an Internet service provider. A traditional speaker 17, microphone 16 and input device 13 are included as well as a power supply 15, which is normally implemented as one or more batteries.

The power supply 15 might further include an external power source that overrides or recharges the built-in batteries, such as an AC adapter. The input device, typically a keypad 13, includes keys 13a, which are numeric and alphanumeric keys typically found on a telephone, and other function keys 13b, used for operating the mobile telephone including, but not limited to, a power key, a SEND key, and various menu scrolling and function keys. Wireless communications with the central control computer utilize a dedicated internal or external transceiver, not shown, as discussed in FIG. 2.

Figure 2:
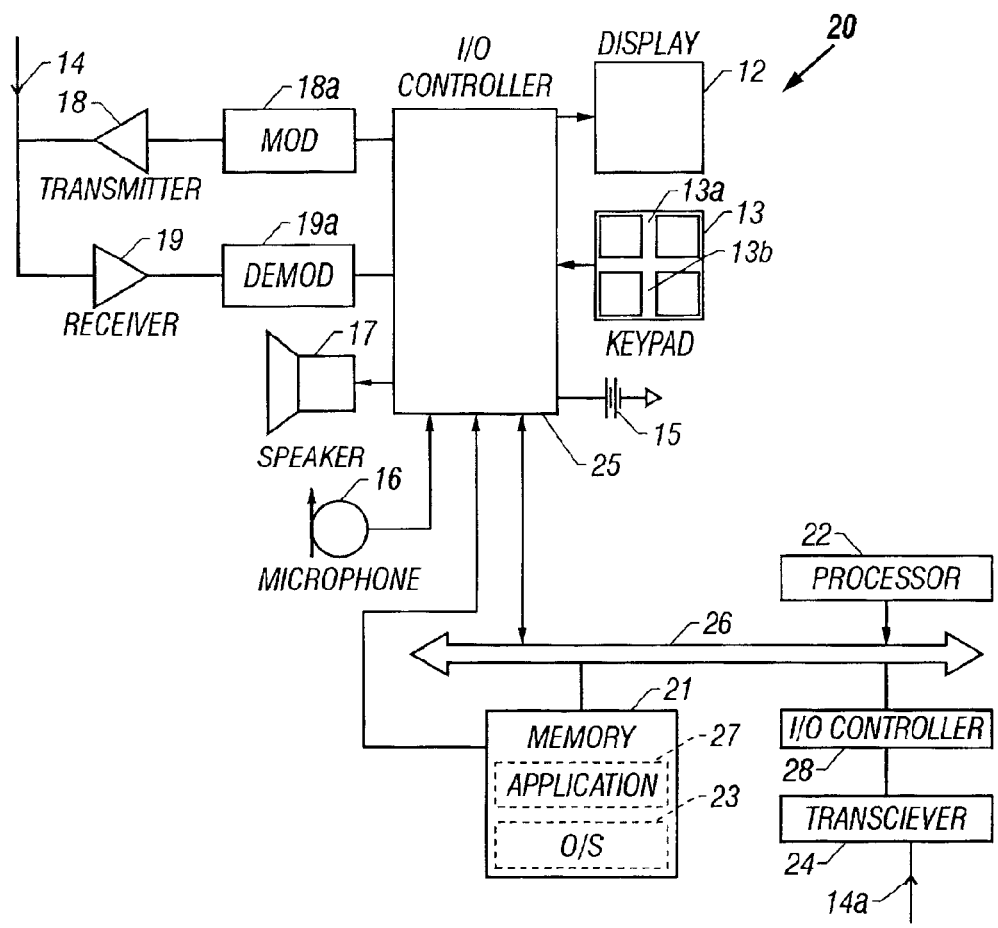
FIG. 2 is a schematic diagram of a mobile telephone suitable for use in accordance with the present invention.

FIG. 2 is a block diagram showing the functional components of the mobile telephone 20. The microphone 16, speaker 17, display 12, keypad 13 and power supply 15 are connected to the I/O controller 25. Also included are an antenna 14, a transmitter 18, a modulator 18a, a demodulator 19a and a receiver 19. These devices receive and transmit signals to and from the mobile telephone network through the antenna. The I/O controller 25 controls the transfer of data and signals to and from the input and output devices of the mobile telephone, such as the keypad 13, display 12, speaker 17 and microphone 16. The system bus 26 provides communication between the processor 22, the I/O controller 25 and memory 21. The term "system bus", as used herein, shall be taken to include the internal bus and any expansion bus, such as an ISA or PCI bus, coupled to the internal bus through a bridge. The memory 21 stores the values of various mobile system parameters and the number assignment module (NAM). The memory also stores application programs 27 and the operating system program 23 that includes instructions to the mobile telephone's components for the operation of the mobile telephone. These programs are executed on the processor 22. A transceiver 24 is connected to the bus through the I/O Controller 25 for communicating with the central control computer. The mobile telephone can be implemented with a transceiver 24 that is an IR (infrared) transceiver and/or an RF (radio frequency) transceiver coupled to its own antenna 14a, or alternatively, the transceiver may be coupled to the mobile telephone's antenna 14.

Figure 3:
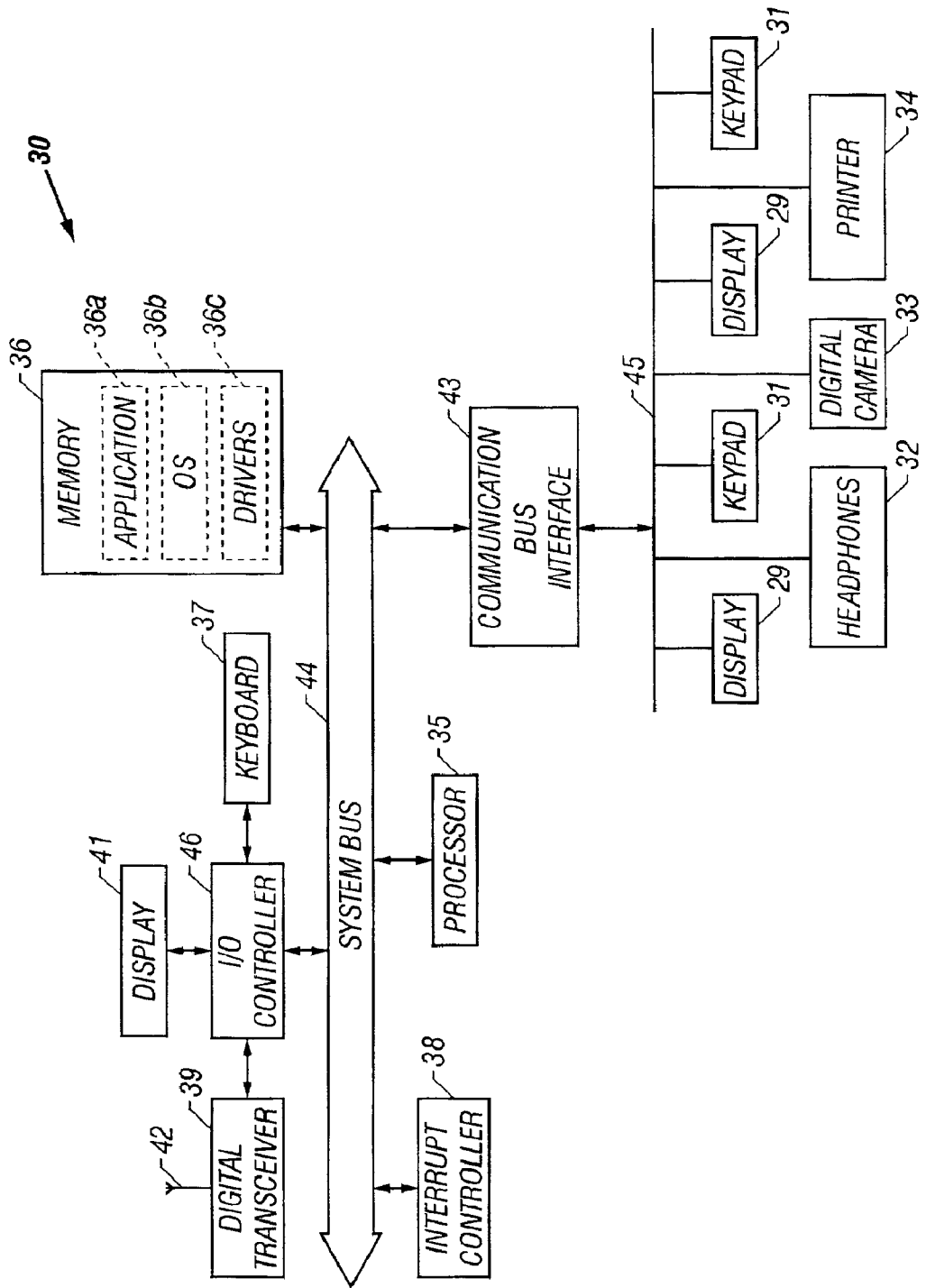
FIG. 3 is a schematic diagram of a central control computer suitable for use in accordance with the present invention.

FIG. 3 shows a central control computer system 30 for a given environment and used in accordance with the present invention. The central control computer system 30 includes a digital transceiver 39 coupled through an I/O controller 46 to the system bus 44. The digital transceiver is also coupled to an antenna 42. The digital transceiver 39 is used for sending signals to, and receiving signals from, the mobile electronic devices, such as a mobile telephone. The central control computer system 30 further includes a display device 41, such as a monitor, and an input device, such as a keyboard 37 or a conventional touch screen input device, not shown. The display device 41 could include an electroluminescent display, liquid crystal display or similar device. The central control computer system further includes components typically found in a computer such as a processor 35, interrupt controller 38, an I/O controller 46 and memory 36. Memory 36 may include RAM, ROM, a hard disk, a floppy disk, CD-ROM or a combination of these devices. The memory 36 also stores application software 36a, the operating system 36b and any required drivers 36c. The application software may include, for example, voice command recognition and map display software.

The central control computer system 30 also is coupled via the communication bus interface 43 to other components that are connected to a central control communication bus 45 and that can, therefore, provide enhancements to mobile electronic devices in the given environment. For example, a plurality of video display units 29 and keypads 31 could be distributed throughout a theater or concert hall, perhaps mounted in the back of each seat in the house for use by the patrons sitting in the seats behind them. During the performance, these displays could quietly inform a patron of an incoming call on the patron's mobile phone and present alternatives that the patron could select by using the keypad. During intermission, these displays could provide information on restaurants or other points of interest in the area of the theater and, upon selection by a patron using the keypad, the central control computer may download directions on how to get to a particular restaurant or download pictures or audio from the performance directly into a mobile computer, telephone or other suitable mobile electronic device. Other examples of features that could be connected to the communications bus 45 are a printer 34, a digital camera 33 and headphones 32.

Figure 4:
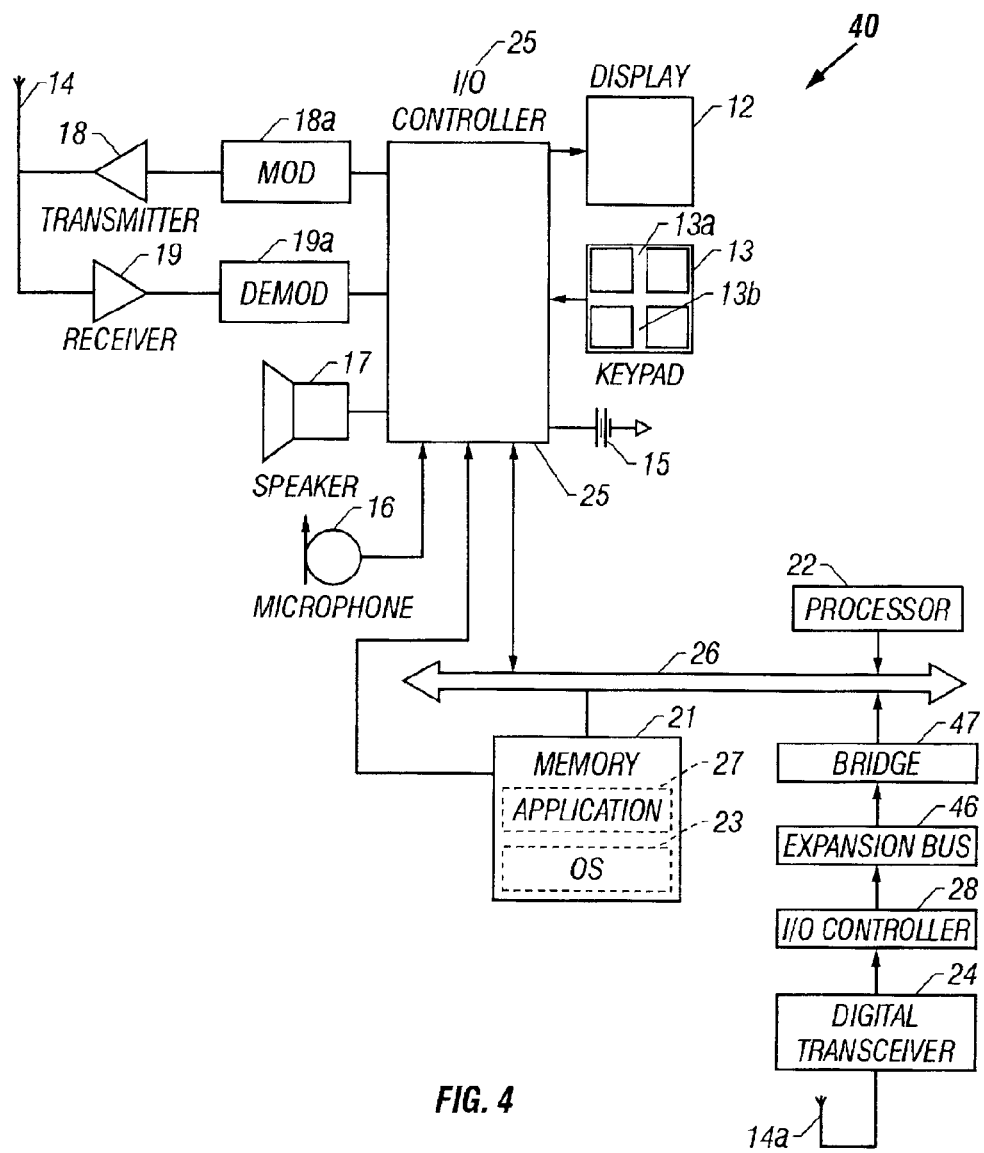
FIG. 4 is a schematic diagram of a second embodiment of a mobile telephone suitable for use in accordance with the present invention.

FIG. 4 shows an alternative mobile telephone 40 that may be used in the present invention having its wireless transceiver coupled to a different bus than that shown in FIG. 2. The mobile telephone 40 is substantially similar to the mobile telephone 20 shown in FIG. 2, except that the digital transceiver 24 is in communication with an expansion bus 46, such as a USB or PCI bus that is, in turn, in communication with the system bus 26 through a bridge 47 rather than communicating directly with the system bus 26. By communicating with the expansion bus 46, the digital transceiver 24 may take the form of an adapter card.

Figure 5:
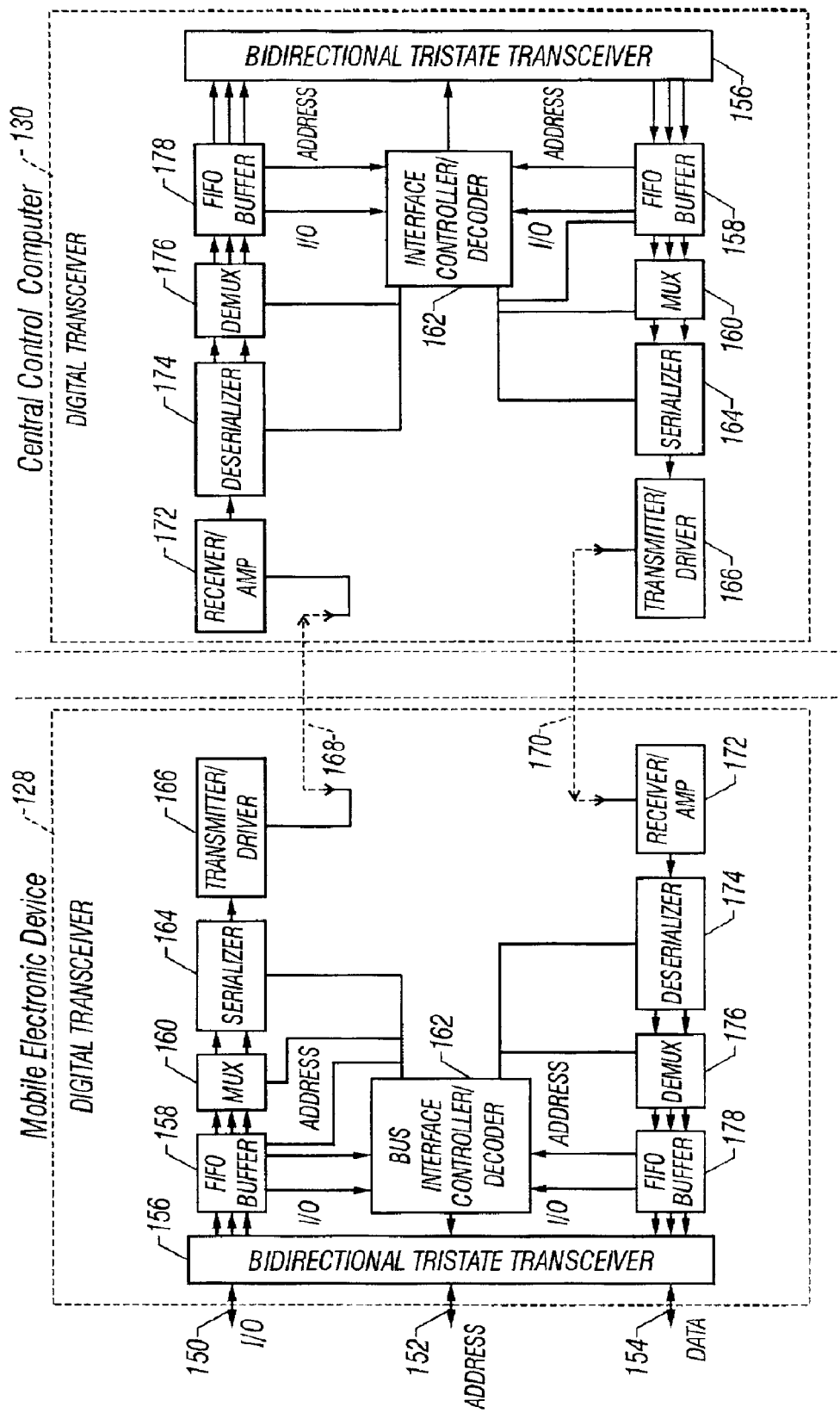
FIG. 5 is a schematic diagram of the digital transceivers in both a central control computer and a wireless mobile electronic device.

FIG. 5 is a schematic diagram of the digital transceiver 128 in the mobile electronic device, such as a mobile telephone, and the digital transceiver 130 in the central control computer. The operation and use of the digital transceivers is described in U.S. Pat. No. 5,877,882, which patent is hereby incorporated by reference herein. It can be seen from the figure that the input/output 150, address locations 152 and data 154 are carried from the relevant bus to and from the transceiver 156. Information coming from the bus passes through the transceiver 156 and then goes to the FIFO buffer 158. The FIFO buffer 158 transmits data 154 to the multiplexer 160. The FIFO buffer 158 transmits the address 152 and the input/output 150 to the bus interface controller/decoder 162. The bus interface controller/decoder directs information then to the multiplexer 160, to the serializer 164, or back to the FIFO buffer 158. The multiplexer 160 directs information to the serializer 164. The serializer 164 then sends information to the transmitter driver 166 which then goes out as a wireless transmission 168, such as radio frequency waves or infrared light.

Incoming wireless transmissions 170 enter a receiver amplifier 172 and are deserialized in the deserializer 174. The deserializer 174 then sends information to the demultiplexer 176. Information goes from the demultiplexer 176 to the FIFO buffer 178 for distribution either to the bus interface controller/decoder 162 to the transceiver 156. The bus interface controller/decoder 162 sends information to the deserializer 174, the demultiplexer 176, or to the transceiver 156. The transceiver 156 then sends received information to the bus. It should be noted that while the system of FIG. 5 could be implemented as software, rather than hardware, the performance might be slower.

The architecture shown in FIG. 5 permits clock variations between the computer and the mobile electronic device. Connection of devices made by different manufacturers is easily achievable since any device that conforms to the wireless link requirements can communicate with the computer. The digital transceiver also negates the need for multi-pin connectors between the mobile electronic device and the central control computer.

It should be recognized that the digital transceivers 128, 130 operate in like fashion with the transmitter of one sending signals to the receiver of the other. It should also be recognized that the digital transceivers 128, 130 operate as described above, whether they are coupled directly to the internal bus 26 (as in FIG. 2) or coupled to an expansion bus 46 that is wireless (as in FIG. 4). Accordingly, the same reference numbers have been placed on the components of the digital transceiver 130 to indicate the identical function.

FIG. 6 is a flow chart illustrating the flow of data between the mobile electronic device 120 and the central control computer 122 over both a serial communication channel 180 and a parallel communication channel 182, shown here as an 8-bit channel. A parallel communication channel may be implemented using 8 transceivers (not including the transceiver dedicated to a discovery channel) that are set to transmit and receive signals at 8 different frequencies. These Figures assume the architecture of FIG. 4, but a similar Figure could be presented to represent the architecture of FIG. 2.

Figure 7:
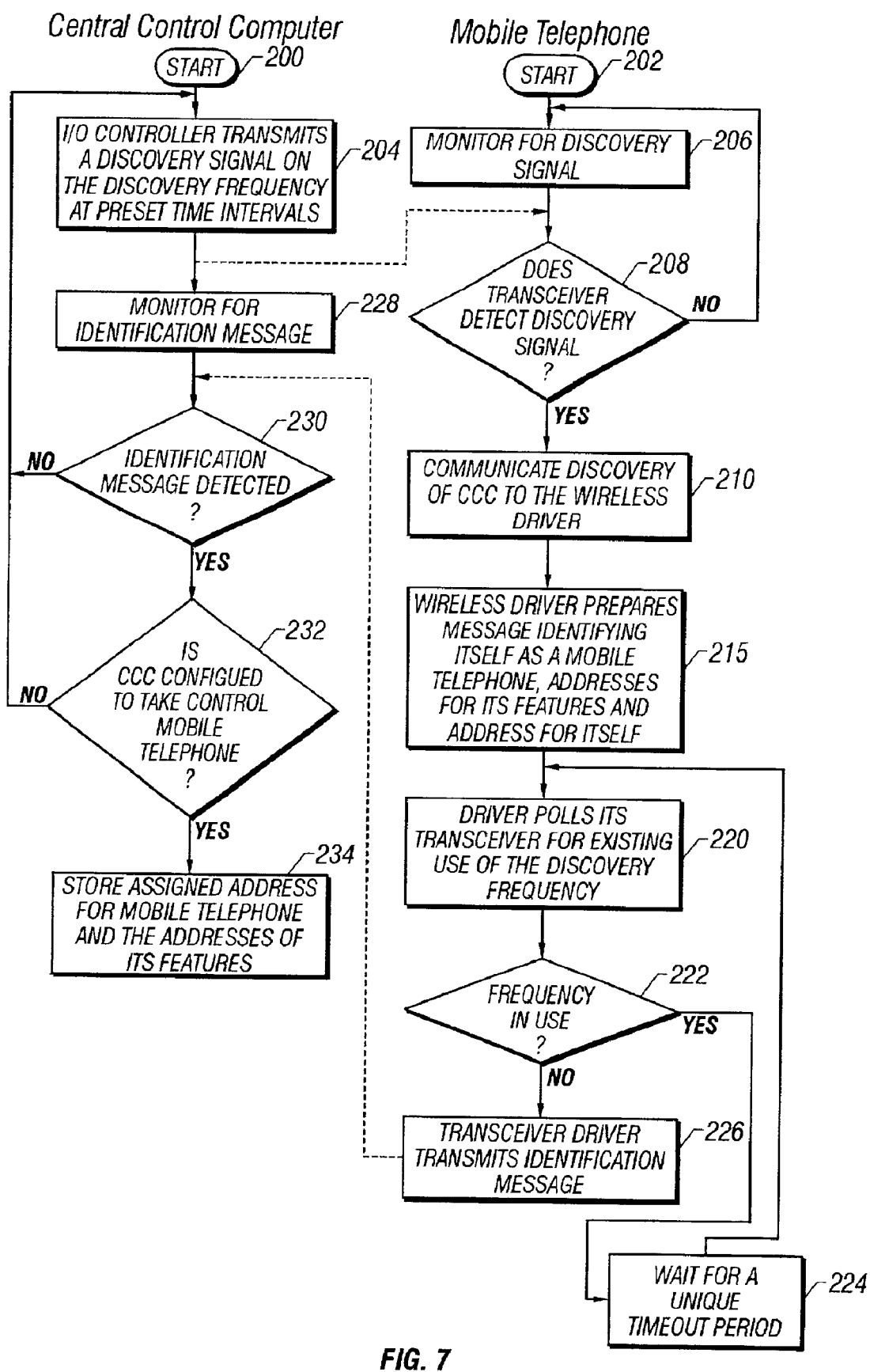
FIG. 7 provides a flowchart for the device discovery process executed by the wireless mobile electronic device and the central control computer.

FIG. 7 provides a flowchart for a discovery process that is carried out between the central control computer and a mobile electronic device, such as a mobile telephone, in accordance with the invention. While the example discussed in FIG. 7 is for the discovery process of a mobile telephone, the discovery process is applicable to a wide range of mobile electronic devices, examples of which were listed previously. The central control computer and the mobile telephone, each equipped with a wireless transceiver, are both turned on in steps 200 and 202. In state 204, the I/O controller transmits a discovery signal on the discovery frequency. Preferably, the discovery frequency will be a standard assigned frequency for mobile electronic devices to monitor to discover an Electronic Device Control System device such as the central control computer. Alternatively, the discovery frequency could be any frequency assigned to the mobile electronic device to monitor. Preferably, the discovery signal also contains an identification request or otherwise prompts for any mobile electronic device that receives the signal to identify itself to the central control computer, to provide addresses for features contained within the mobile electronic device, and to provide an address for the mobile electronic device itself. The features within the mobile electronic device may include, for example, a keypad, keyboard, display, speaker, microphone, transceiver, joystick, memory, transmitter, receiver, printer, scanner, drivers for peripheral devices and electronic flash. Alternatively, the central control computer could communicate the description request after communications between the central control computer and the mobile electronic device were established. This alternative would be required if the mobile electronic device was transmitting the discovery signal.

The mobile telephone, in state 206, monitors the discovery frequency for the discovery signal. If, in state 208, the mobile telephone's transceiver does not detect the discovery signal, then the mobile telephone continues to monitor for the discovery signal in state 206. If, in state 208, the transceiver does detect the discovery signal, then in state 210, the transceiver communicates the discovery of the central control computer to the wireless driver. In state 215, the wireless driver prepares a message to the central control computer identifying itself as a mobile telephone and further providing the addresses for the mobile telephone's features, including the user I/O devices, and an address for the mobile telephone. The address for the mobile telephone could be pre-assigned or it could be an address randomly generated at the time the message is prepared. A randomly generated address would better ensure that there is no duplication with an address of another mobile electronic device within the given environment.

States 220 through 224 are the steps of the polling method. In state 220, the wireless driver polls its transceiver for existing use of the discovery frequency and, in state 222, the wireless driver determines whether the discovery frequency is already being used. If the discovery frequency is currently being used, then in state 224, the wireless driver waits for a unique timeout period before polling the discovery frequency again. Preferably the unique timeout period is assigned to the mobile telephone computer in a manner that maximizes the discovery frequency's availability by preventing the mobile telephone from repeatedly polling at the exact same time and interval as another mobile electronic device is transmitting its discovery signal at the same frequency. In state 226, the mobile telephone transmits the identification message on the discovery frequency. As in state 204, each Electronic Device Control System (EDCS) will transmit a discovery signal on the same discovery frequency in order to allow detection of the EDCS by the mobile electronic device. Alternatively, it is possible to establish different frequencies that are to be used with different EDCS's, such that when the mobile electronic device detects a discovery signal transmitting at a given frequency, that frequency will indicate to the mobile electronic device what type of environment the EDCS is within, i.e., hospital, aircraft, concert hall, and so forth. Furthermore, while it is possible to establish a system in which the mobile electronic device transmits a discovery signal to the central control computer, the preferred method is for the EDCS to transmit the discovery signal as set out in states 204–210 since this conserves the use of the mobile electronic device's processor for other tasks and also minimizes the power usage that must be supplied by the battery of the mobile electronic device.

In state 228, the central control computer monitors its discovery frequency transceiver for identification messages from mobile electronic devices entering the given environment. If no identification message is detected in state 230, then the process returns to state 204 for further transmission. If, in state 230, the transceiver detects an identification message from the mobile telephone, then in state 232, the central control computer determines whether it is configured to take control of the mobile telephone. If, in state 232, the central control computer determines that it is not configured to take control of the mobile telephone, then the central control computer returns to state 204, transmitting the discovery signal. If, in state 232, the central control computer determines that it is configured to take control of the mobile telephone, then in state 234, the central control computer stores the address for the mobile telephone and the addresses for the mobile telephone's features that were contained in the identification message.

The mobile telephone uses its address to identify its messages received from the central control computer as opposed to other messages transmitted by the central control computer destined for other mobile electronic devices within the given environment. The central control computer also uses this address to identify any messages transmitted by the mobile telephone to distinguish them from messages transmitted by other mobile electronic devices in the given environment. This concludes what may be considered to be the discovery process, since both the central control computer and the mobile telephone know that the other exists and how to communicate with the other.

Figure 8A:
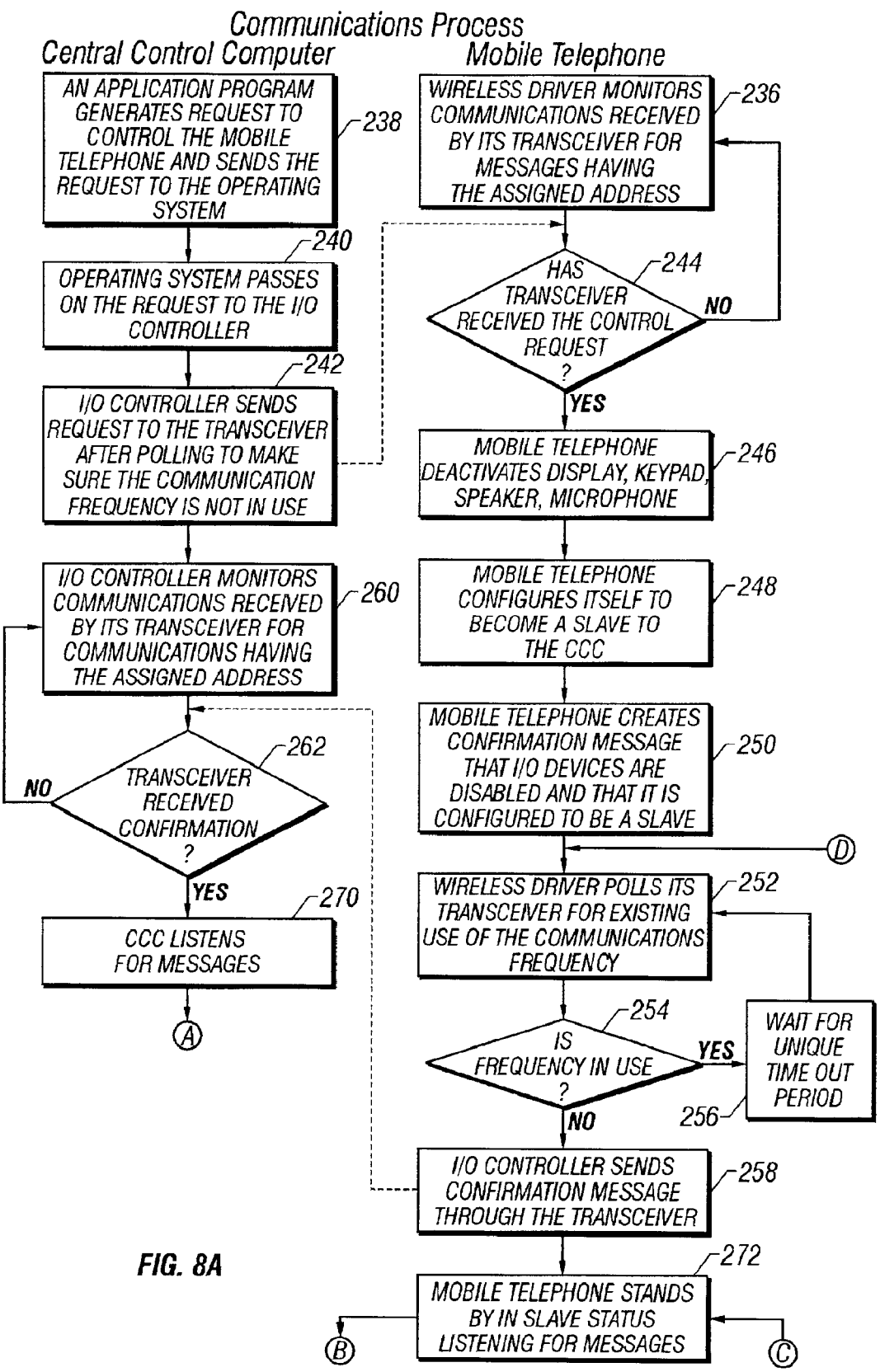
FIGS. 8A–B provide a flowchart for the device communication process between the device and the central control computer.
Figure 8B:
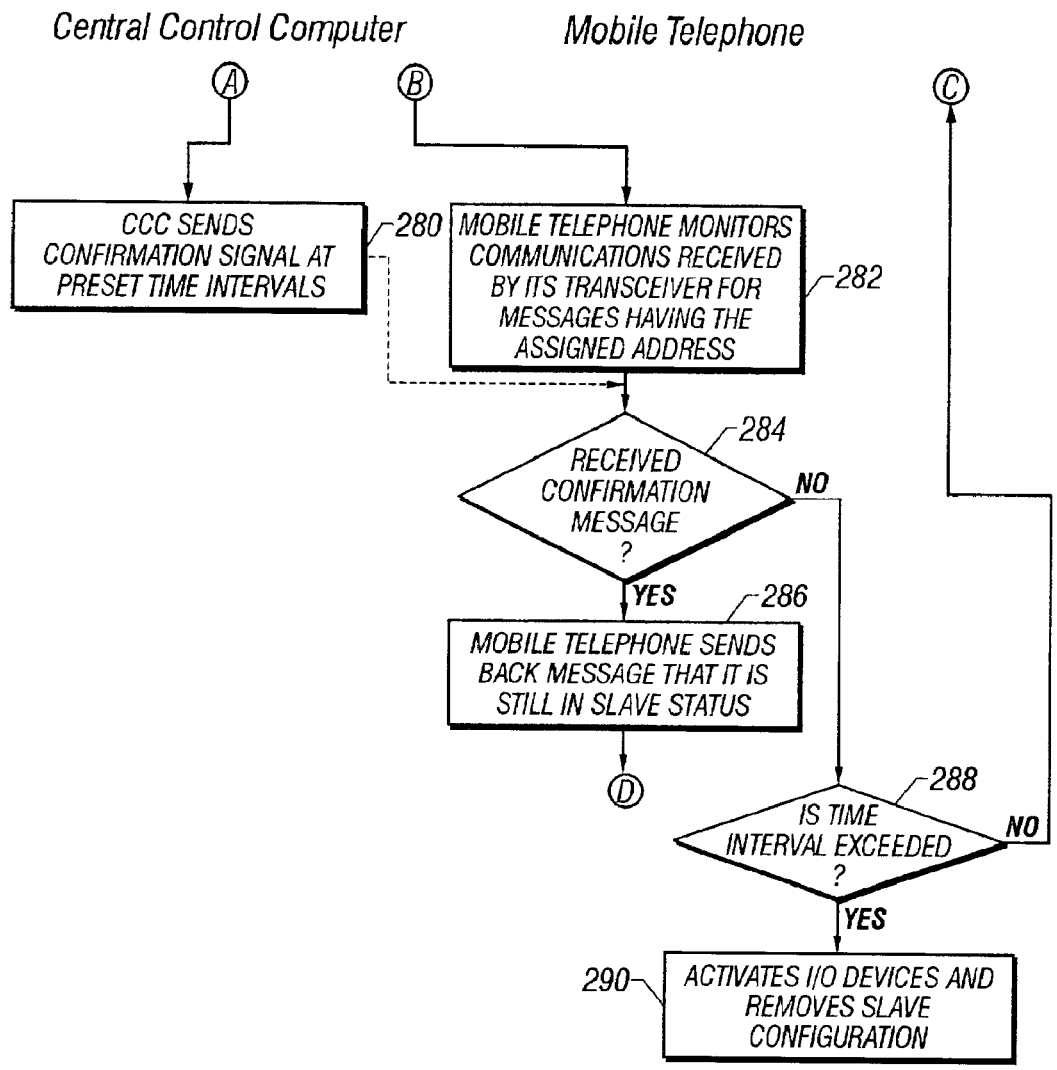

FIGS. 8A–B provide a flowchart for a communication process that is carried out between the central control computer and the mobile electronic device, such as a mobile telephone, after the discovery process. While the example discussed in FIGS. 8A–B is for communication with a mobile telephone, the communications process is applicable to a wide range of mobile electronic devices, examples of which were listed previously. This communication process is also used for all communications between the mobile electronic devices and the central control computer, including the methods set out in FIGS. 9–11. In state 236, the wireless driver of the mobile telephone monitors communications received by its transceiver for communications having the assigned address. In state 238, an application program being executed by the central control computer generates a request to take control of the mobile telephone with an instruction to deactivate certain features of the mobile electronic device and then sends the request to the operating system. The features that the central control computer requests to deactivate are either a comprehensive list of features that would be inappropriate in the environment or are selected from the list of features that were sent to the central control computer in the wireless identification message discussed above with FIG. 7. In turn, according to state 240, the operating system passes on the request to the I/O controller. After polling to determine that the communications frequency is not in use, the I/O controller sends the request to the transceiver for transmitting to the mobile telephone in state 242.

In state 244, the mobile telephone determines whether the transceiver has received a control request with the assigned address. If no control request with the assigned address has been received, then the wireless driver continues to monitor communications in accordance with state 236. If an I/O request has been received with the assigned address, then in state 246, the control request is passed on through the transceiver to the device drivers and the control request is processed resulting in the deactivation of the requested features, such as the mobile telephone's speaker, microphone, display, keypad or combinations thereof. In state 248, the mobile telephone configures itself, in response to the control request, to become a slave to the master central control computer. As a slave device, the mobile telephone's device drivers and processor will respond to all commands from the master central control computer's processor that is running the mobile electronic device application program or, more specifically, the mobile telephone application program. This is possible because the processor and I/O controller of the mobile telephone are now in communication through the transceiver to the I/O controller and processor of the central control computer. The master central control computer will only permit communication between the user and the functions of the mobile electronic device as deemed appropriate by the central control computer. Additionally, the present invention provides for the central control computer to make available substitute functions for the disabled functions and to make available other additional functions, thereby enhancing the utility of the mobile electronic device even though some of the functions of the mobile electronic device may have been disabled.

In state 250, the mobile telephone creates a confirmation message that the user I/O devices are disabled and that the mobile telephone is configured as a slave. In states 252–256, the mobile telephone uses the polling procedure, as before, to determine that the communications frequency is not in use. In state 252, the wireless driver polls its transceiver for existing use of the communications frequency. If, in state 254, the communications frequency is in use, then in state 256, the wireless driver waits for a unique time out period before returning to state 252. If, in state 254, the communications frequency is not in use, then in state 258, the wireless driver sends the confirmation message through the transceiver to the central control computer. Meanwhile, in state 260, the central control computer's I/O controller is monitoring the communications frequency for messages received by its transceiver. If, in state 262, no messages have been received from the mobile telephone, then the central control computer continues to monitor for messages in state 260. If, in state 262, the transceiver has received the confirmation, then in state 270, the central control computer stands by as the master, listening for messages from the mobile telephone or waiting for instructions from the user to place a mobile telephone call. In state 272, the mobile telephone stands by in slave status listening for messages from the central control computer and monitoring the mobile telephone system for an outside call directed to the mobile telephone.

The central control computer sends a confirmation message, perhaps on the discovery frequency, to the mobile telephone at preset timed intervals to assure the mobile telephone that the mobile telephone should remain in slave status. Otherwise, the mobile telephone will reconfigure itself to the mobile telephone's normal status and activate the keypad, display, microphone and speaker. This ensures that the mobile telephone is ready for use when the central control computer is no longer available for controlling the mobile telephone when, for example, the electronic mobile device exits the given environment. In state 280, the central control computer sends the confirmation message at preset time intervals. In state 282, the mobile telephone continues to monitor the communications received by its transceiver from the central control computer for messages having the assigned address. If, in state 284, the confirmation message has been received, then in state 286, the mobile telephone returns a message confirming that the mobile telephone remains in slave status and the method continues to state 272 as discussed above. If, in state 284 the confirmation message is not received, then in state 288, the mobile telephone determines whether a preset time interval has passed. If, in state 288, the preset time interval has not passed, then the mobile telephone remains in slave status as in state 272. If, in state 288, the preset time interval has passed, then in state 290, the mobile telephone reactivates the I/O devices and removes the slave configuration so that the mobile telephone is returned to normal status. It should be noted that at any time the central control computer may, when the circumstances of the environment no longer require the mobile electronic device to be controlled, transmit a message to the mobile electronic device releasing it from control and instructing the mobile electronic device to reconfigure itself to normal status, or the central controlled computer may transmit a message releasing control of certain mobile device features.

It is an important feature of the invention that the mobile electronic device identification and addressing process allows for the discovery, addressing and utilization of the central control computer and, optionally, other electronic devices. Accordingly, the central control computer can control a mobile telephone, PDA, notebook computer, and the like, and have them each configured and controlled simultaneously. If the transceivers are all communicating at the same frequency, however, then the computer can communicate with only one device at a time. Even so, by repeatedly switching the transmission between the address of one mobile electronic device to the address of one or more other mobile electronic devices, it is possible to achieve communications that appear to be simultaneous.

Figures 6A, 6B:
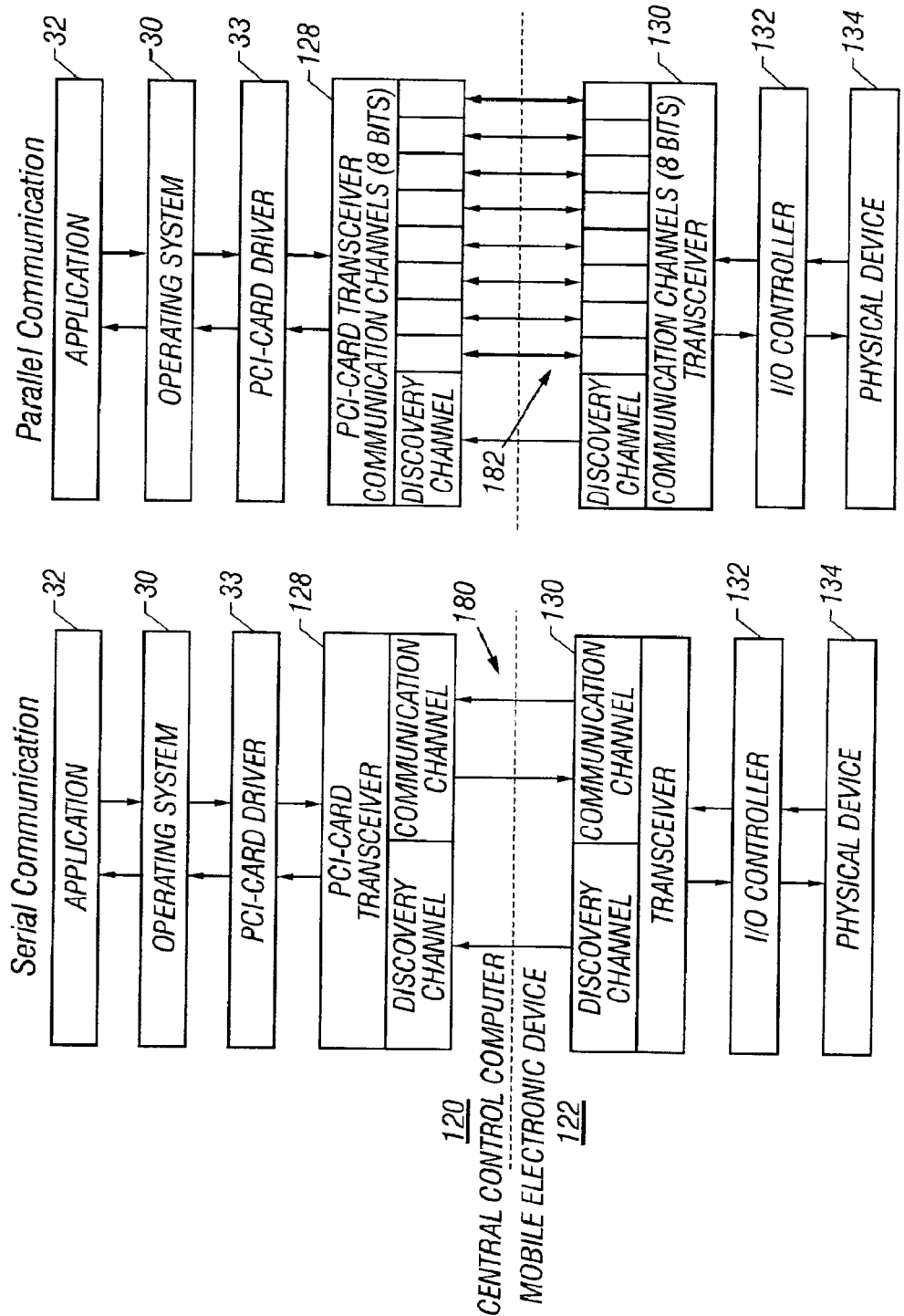
FIGS. 6A–B are flow diagrams illustrating the flow of data between a central control computer and a wireless mobile electronic device over both a serial communication channel and a parallel communication channel.

In order to achieve true multi-channel communications with multiple mobile electronic devices, each of the transceivers, such as the 8 transceivers facilitating the 8-bit communication of FIG. 6B, must transmit at a different frequency. Upon discovery of a mobile electronic device, the mobile electronic device is assigned to a particular transmission frequency rather than being assigned an address. In this manner, any transmission at the assigned frequency is essentially a direct communication with the mobile electronic device.

It is an optional feature of the present invention to allow the central control computer operator to set up certain preferences about how the central control computer will operate. It is anticipated that the operator may desire to establish a preference that would always automatically control the mobile telephone or other mobile electronic devices, as in state 232 of FIG. 7, as soon as the identification message is received by the transceiver. Another advantageous preference would be to limit the types of mobile electronic devices that the operator wants to control. For example, the operator may prefer to automatically accept the mobile telephone and a digital camera, but not a computer game or a personal digital assistant. Other and further preferences are within the scope of the present invention. While it is possible to have preferences set up in the mobile electronic device, it is preferred that the mobile electronic device have no choice but to allow itself to be controlled by an EDCS.

Figure 9:
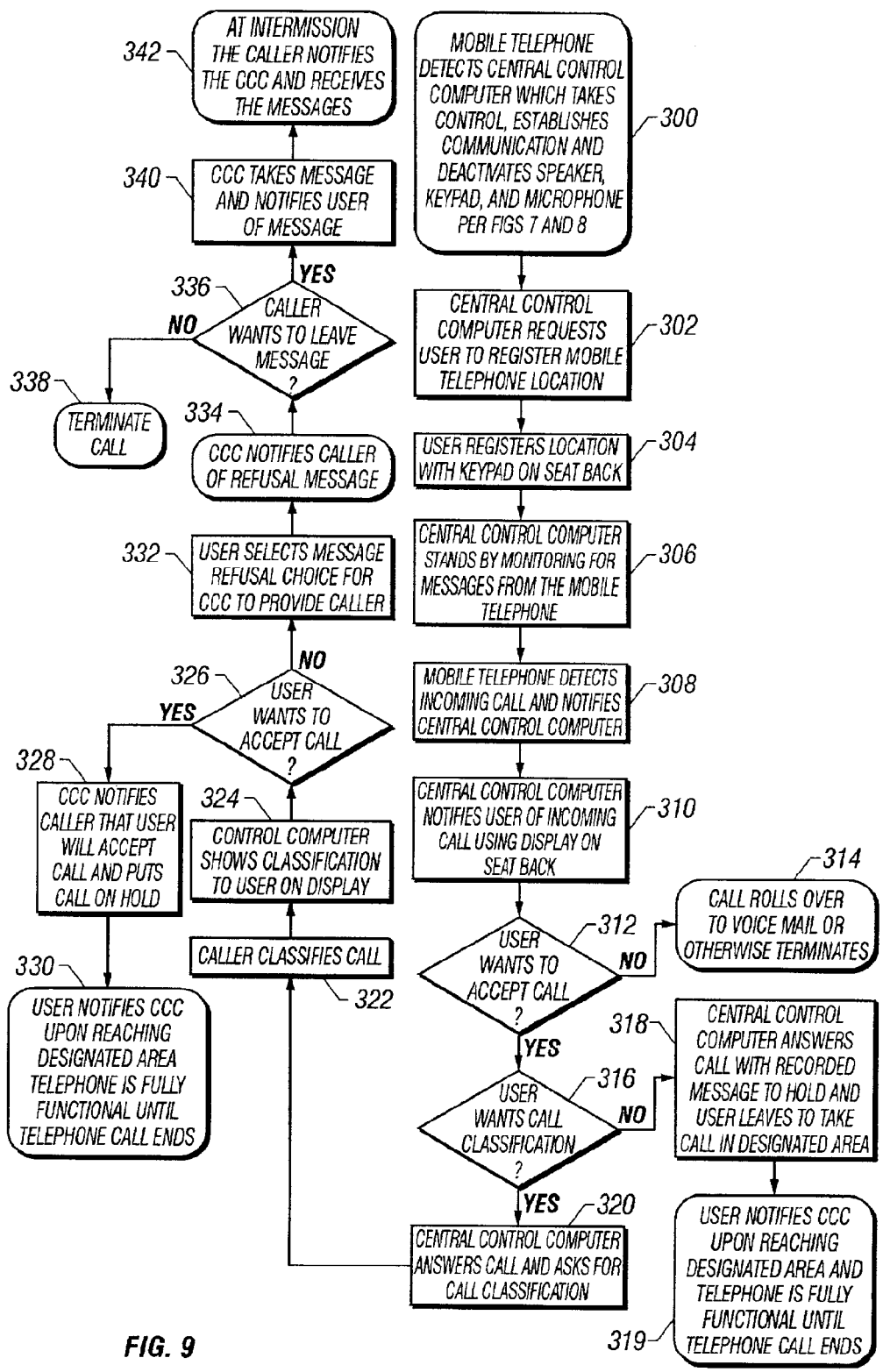
FIG. 9 is a flow chart of a method of using a mobile telephone in a concert hall.

FIG. 9 is a flowchart of a method of receiving a mobile telephone call in a concert hall or theater. In this example, the central control computer is connected through a communications bus to a plurality of keypads and displays mounted in the back of each theater seat as shown in FIG. 3. While this example is for a mobile telephone used in a concert hall or theater, the method of the present invention may be used with many different types of mobile electronic devices, examples of which have been listed previously, in any environment where use of a mobile electronic device may be a nuisance to surrounding patrons or customers. In state 300, the mobile telephone detects the central control computer, which takes control of the mobile telephone, and the speaker, microphone and keypad, are deactivated, all as shown in FIGS. 7 and 8. In state 302, the central control computer requests the mobile telephone user to associate the mobile telephone with the user's seat number. This identifies for the central control computer the location of the display on the seat back through which the central control computer will communicate with the user. The registration may be accomplished, in state 304, by keying in either the telephone number assigned to the mobile telephone or the address that was assigned to the mobile telephone by the method shown in FIG. 7. In state 306, the central control computer stands by monitoring for messages from the mobile telephone. In state 308, the mobile telephone detects an incoming telephone call and notifies the central control computer, albeit without ringing or displaying the call. In state 310, the central control computer notifies the user of the incoming call by displaying a message on the display mounted in the identified seat back. If the mobile telephone has caller ID capability, the caller ID may also be displayed.

In state 312, the user decides whether to accept the mobile telephone call. If, in state 312, the user decides not to accept the call, then in state 314, the telephone call rolls over to voice mail or is otherwise terminated. If, in state 312, the user decides to accept the mobile telephone call, the user may, in state 312, decide to ask for call classification. If, in state 312, the user decides to take the call without asking for call classification, then in state 318, the central control computer will answer the mobile telephone with a recorded message asking the caller to wait while the user leaves to take the mobile telephone call in an area designated for mobile telephone use or access. In state 319, the user notifies the central control computer (CCC) by using a keypad in the designated area to enter his sent number, that the telephone call may now be put through to the mobile telephone. The central control computer authorizes the mobile telephone to activate the features that had been disabled and the call may be taken off hold and proceed normally. Upon termination of the telephone call, the mobile telephone is again instructed by the central control computer to deactivate the speaker, microphone, display and keypad.

If, in state 316, the user decides to ask for call classification, the central control computer asks the mobile telephone caller, with a recorded message, to identify the status of the call from a menu selection provided, such as, for example, emergency, wait till intermission, or call at another convenient time. In state 322, the caller classifies the call by using his telephone's keypad, and in state 324, the central control computer indicates, on the display located on the seat back, the call classification. In state 326, the user decides whether to accept the call after viewing the call classification. If, in state 326, the user decides to accept the call, then in state 328, the central control computer (CCC) notifies the caller, with a recorded message, to continue to hold until the user can take the mobile telephone call in the area designated for using a mobile telephone. Then, in state 330, the user notifies the central control computer, by using a keypad in the designated area to enter his seat number, that the telephone call may now be put through to the mobile telephone. The central control computer authorizes the mobile telephone to activate the features that had been disabled and the call may be taken off hold and proceed normally. Upon termination of the telephone call, the mobile telephone is again instructed by the central control computer to deactivate the speaker, microphone, display and keypad. It should be noted that the user may use the mobile telephone at any time by first going to the area designated for mobile telephone use and requesting, by using the keypad in the designated area, that the central control computer activate the disabled features while the user places a call.

If, in state 326, the user decides not to take the mobile telephone call, then in state 332, the user selects a message to give the caller from a menu provided on the display mounted in the seat back. These messages may be, for example, to please leave a message, will call at intermission, will call at end of event, or will call at a designated time stated by the user using the keypad. In state 334, the central control computer (CCC) informs the caller of the refusal message and, in state 336, offers to take a message. If, in state 336, the caller decides not to leave a message, then in state 338, the mobile telephone call is terminated. If, in state 336, the caller decides to leave a message, then in state 340, the central control computer (CCC) records the message and notifies the user, on the display in the seat back, that a message is waiting. Then, in state 342, at intermission, the user notifies the central control computer (CCC), by using the keypad mounted in the back of the seat, that the user is ready to take the message and the central control computer plays the recorded message over the mobile telephone speaker, perhaps even without going to the designated area. However, to place a call in response to the message, the user must go to the designated area.

The communication between the mobile electronic device and the central control computer is accomplished by the central control computer knowing the addresses of the various functions of the mobile electronic device and by the mobile electronic device knowing to forward all of the mobile electronic device generated instructions, that would normally go to the addresses of the limited or disabled functions, to the central control computer via the wireless transceiver. For example, when an incoming call is sensed by the mobile telephone, the mobile telephone would normally notify the user of the incoming call by generating an audio signal addressed to the speaker. However, since the speaker is deactivated, the present invention provides for sending the instruction having the address for the speaker to the central control computer. Upon getting the instruction from the mobile telephone, the central control computer determines from the address of the mobile telephone, the address of the device speaker and the instruction in the message, that the speaker was intended to ring, and therefore, the central control computer determines that there is an incoming call and the user is notified by sending a message to the display mounted in the seat back in front of the user.

Figure 10:
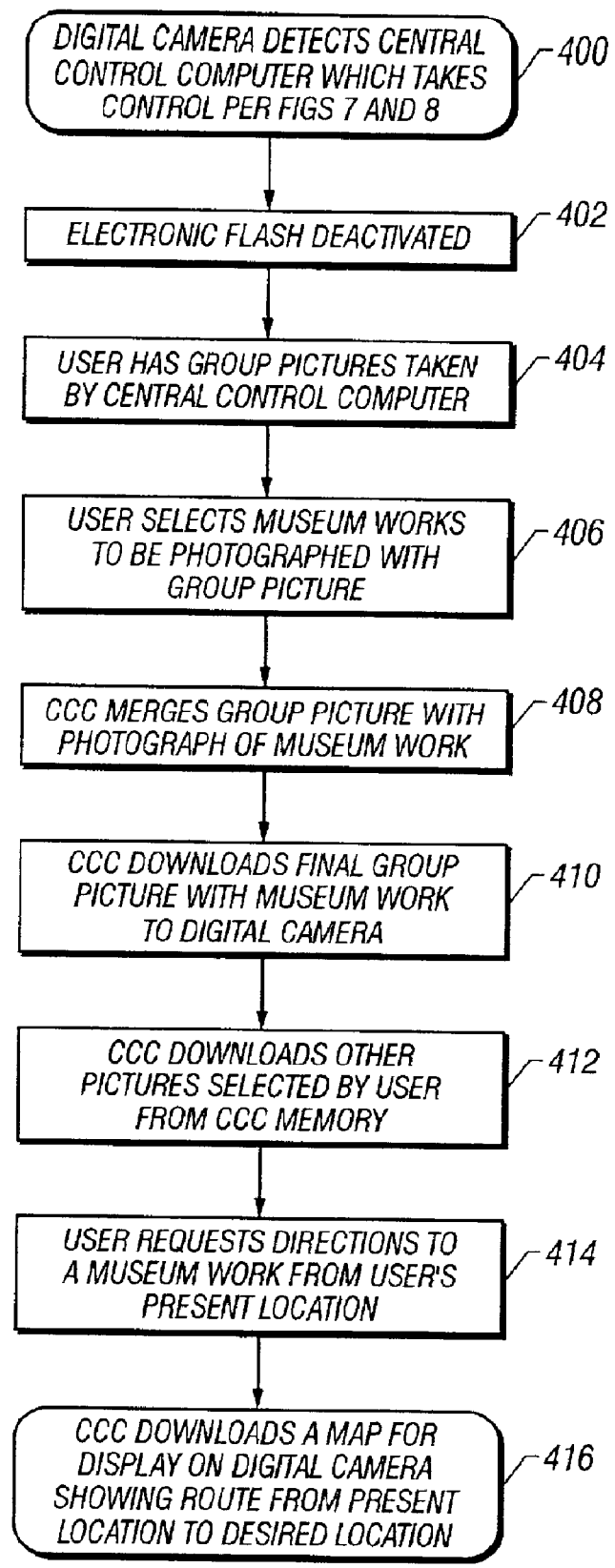
FIG. 10 is a flow chart of a method of using a digital camera in a museum.

FIG. 10 is a flowchart of a method for using a digital camera in a museum or other environment that prohibits the use of an electronic flash. While this example is for a digital camera used in a museum, the method of the present invention may be used with many different types of mobile electronic devices, examples of which have been listed previously, in any environment where use of a feature of the device may be a nuisance to surrounding patrons or customers or where the device may be harmful or dangerous to property or other people in the environment. In this example, the central control computer is connected through a communications bus to a plurality of keypads and displays mounted throughout the museum as shown in FIG. 3. In state 400, the digital camera detects the central control computer within the museum, which takes control of the digital camera and stores the assigned address for the digital camera and addresses for the electronic flash, memory, and other features using the same method as shown in FIG. 7, except now being applied to a digital camera. In state 402, the electronic flash is deactivated and communications are established by the same methods as shown in FIGS. 7 and 8 as applied to a digital camera. This ensures that the digital camera cannot use the digital camera's electronic flash while inside the museum, thus preventing harm to the museum's displayed works.

The present invention also provides enhancements available to the digital camera having a wireless transceiver in communication with the central control computer within the museum. One enhancement may be that the central control computer downloads to the digital camera electronic pictures of selected works contained in the museum whenever the user takes or requests a picture. Furthermore, if the central control computer obtains a picture of the user and the user's companions from the user's digital camera or from a digital camera that is connected to the communications bus as shown in FIG. 3, the computer may superimpose the group picture in front of the selected museum work before downloading it to present as a souvenir of the group's visit. In state 404, the central control computer takes a picture of the user's group, against a blind background, at a station in the museum provided for that purpose. The picture is registered as belonging to the digital camera having the digital camera's assigned address. In state 406, the user then selects a digital picture from a menu selection of available pictures displayed on a display set up in the museum for that purpose and orders the selection using a keypad provided at the display and identifies the address of the digital camera ordering the pictures. In state 408, the central control computer (CCC) merges the group picture with the selected work's picture and, in state 410, downloads the merged picture into the memory of the digital camera, using the address for the memory supplied by the digital camera through the identification message, or alternatively sends the pictures to an e-mail address.

The present invention provides another example of an enhancement by downloading a map with directions to particular works in the museum or to a section of the museum. In this method, the user, in state 414, addresses the central control computer, using a display and keypad located at various locations throughout the museum, and asks for directions from the display unit to another part of the museum. The central control computer, in state 416, then downloads a map containing directions as requested into the memory of the digital camera for viewing by the user.

Figure 11:
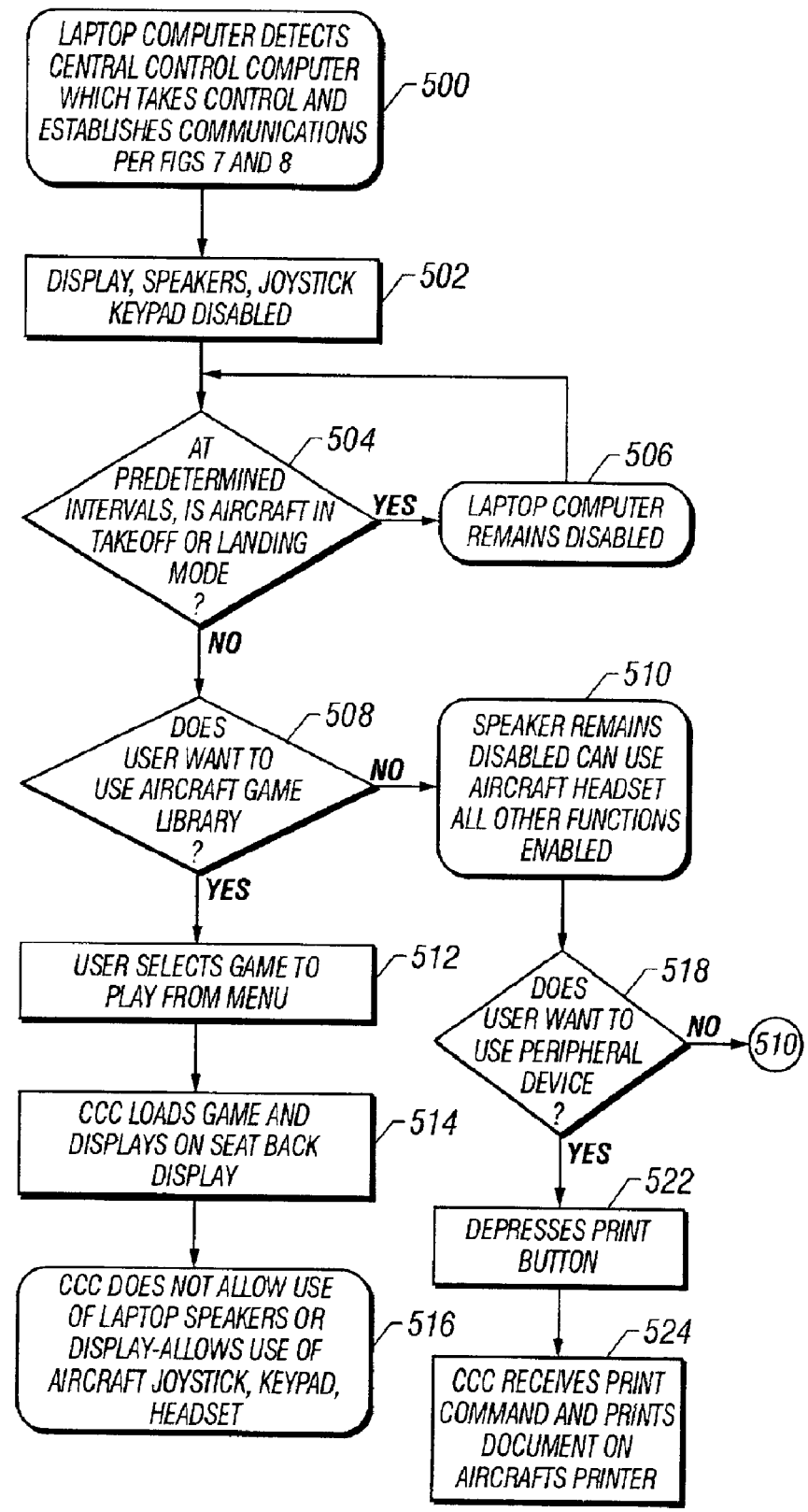
FIG. 11 is a flow chart of a method of using a laptop computer on an aircraft.

FIG. 11 is a flowchart of a method for using a laptop computer in an aircraft. While this example is for a laptop computer used on an aircraft, the method of the present invention may be used with many different types of mobile electronic devices, examples of which have been listed previously, in any environment where the use of a feature of the device may be a nuisance to surrounding passengers or may be unsafe in the given environment at various times. In this example, the central control computer is connected through a communications bus to a plurality of keypads, displays and headphones, as shown in FIG. 3, mounted in the back of the passenger seats. In state 500, the laptop computer detects the central control computer, which starts to transmit the discovery signal when activated by aircraft personnel before takeoff, and the central control computer takes control of the laptop computer and establishes communication per the method shown in FIGS. 7 and 8. In state 502, the laptop computer's display, speaker, joystick and keypad are disabled using the method of FIG. 8. In state 504, the central control computer determines, at pre-determined intervals, if the aircraft is in takeoff or landing mode. If, in state 504, the aircraft is in takeoff or landing mode, then in state 506, the laptop computer remains disabled and the method returns to state 504 until the next pre-determined interval. If, in state 504, the aircraft is not in takeoff or landing mode, then the user may, in state 508, decide to use one of the enhancing features of the present invention and use the game library of the aircraft stored in the memory of the central control computer. This could include the ability to play games with other passengers. If, in state 508, the user decides not to take advantage of this feature, then in state 510, the speaker remains disabled so as not to bother other passengers but the headset provided at the passenger's seat is enabled for use and the user may play any video games on the laptop computer using the headphones played through the central control computer. Alternatively, if in state 504 the aircraft is not in landing or takeoff mode, in state 510, the user may decide whether or not to use a peripheral device available on the aircraft such as a printer. If, in state 518, the user decides not to use any available peripheral devices, then the user may use the laptop computer as in state 510. If, in state 518, the user decides to use a peripheral, then in state 522, the user depresses the print button on the laptop computer and in state 524, the central control computer prints the user's document on the aircraft's printer.

If, in state 508, the user decides to use the game library, then in state 512, the user selects a game from the menu presented on the display on the back of the seat in front of the user. In state 514, the central control computer loads the selected game and displays the game on the display mounted in the seat back and plays the audio over the aircraft's headphones. Using the joystick and keypad of the laptop computer, the user may use the laptop computer playing the selected game running on the central control computer. The user may also be given the option to access other information, such as the planes location presented on a map of the area over which the plane is flying.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for controlling and enhancing the use of mobile electronic devices within a given environment, comprising:

transmitting a wireless control message within the given environment from a central control computer;

establishing a wireless communication link between the control computer and a mobile electronic device upon the mobile electronic device entering the environment and receiving the control message;

communicating instructions from the central control computer to the mobile electronic device to disable one or more of features within the mobile electronic device; and communicating instructions from the central control computer to the mobile electronic device to provide the mobile electronic device with access to one or more features associated with the central control computer.

2. The method of claim 1, wherein the one or more features associated with the central control computer are selected from a wireless transceiver, a global positioning system, antenna, speaker, microphone, printer, display screen, keyboard, voice response, databases, spreadsheets, computer games, video games, processing power, word processing, maps, directions or combinations thereof and wherein the one or more features are not software downloaded to the mobile electronic device.

3. The method of claim 1, wherein the one or more features associated with the central control computer are substitutes for the one or more disabled features within the mobile electronic device.

4. The method of claim 1, wherein the one or more features associated with the central control computer are enhancements to the mobile electronic device, wherein the enhancements provide one or more features not possessed by the mobile electronic device.

5. The method of claim 1, wherein the features within the mobile electronic device are selected from keypad, keyboard, display, speaker, microphone, transceiver, joystick, memory, transmitter, receiver, electronic flash, drivers for peripheral devices, printer, scanner or combinations thereof.

6. The method of claim 1, wherein the features within the mobile electronic device are selected from user input devices, user output devices, transmitter, receiver, memory, transceiver, I/O controller, drivers for peripheral devices or combinations thereof.

7. The method of claim 1, wherein the mobile electronic device is selected from a mobile telephone, a handheld personal computer, a personal organizer, a palmtop computer, a computerized notepad, a global positioning system (GPS), an electronic video game player, a video player, an MP3 audio player, a personal digital assistant, digital camera, video recorders, audio recorders or combinations thereof.

8. The method of claim 1, wherein the mobile electronic device has a wireless transceiver for transmitting and receiving wireless signals selected from radio frequency and infrared.

9. The method of claim 1, wherein the given environment is selected from aircraft, hospital, automobile, museum, library, movie theater, concert hall, stage theater, amusement park, taxi, train, restaurant, sports arena, shopping mall and office building.

10. The method of claim 1, wherein the given environment is defined as the area in which the wireless control message transmission can be received by the mobile electronic device.

11. The method of claim 1, wherein the wireless control message contains requests consisting of a request for information describing the mobile electronic device, a request to provide addresses for the features of the mobile electronic device, a request to provide an address for the mobile electronic device and combinations thereof.

12. The method of claim 11, wherein the address for the mobile electronic device is selected from a pre-assigned address or an address randomly generated by the mobile electronic device at the time the wireless control message is received by the mobile electronic device.

13. The method of claim 1, wherein the step of establishing a wireless communication link further comprises:

receiving the wireless control message by the mobile electronic device;

interpreting the control message to be an identification request from the central control computer; and transmitting a wireless identification message to the central control computer, wherein the wireless identification message contains information describing the mobile electronic device, an address for the mobile electronic device, and an address for each of the features within the electronic device.

14. The method of claim 13, wherein the step of establishing a wireless communication link further comprises:

storing the address for the mobile electronic device, and the address for each of the features within the mobile electronic device;

monitoring by the mobile electronic device for messages to the assigned address for the mobile electronic device; and monitoring by the central control computer for messages from the assigned address for the mobile electronic device.

15. The method of claim 14, wherein each of the messages to and from the assigned address for the mobile electronic device comprises the address for the mobile electronic device, the address for the one or more features of the mobile electronic device, and instructions for the one or more features of the mobile electronic device to perform.

16. The method of claim 14, wherein the step of providing the mobile electronic device with access to one or more features associated with the central control computer further comprises:

receiving a message from the mobile electronic device;

comparing the address for the feature of the mobile electronic device contained in the message with a list of addresses for the features of the mobile electronic device included in the wireless identification message; and instructing a substitute feature of the central control computer to perform the instruction contained in the message.

17. The method of claim 14, wherein the step of providing the mobile electronic device with access to one or more features associated with the central control computer further comprises:

displaying a menu of available features to the user;

receiving a request to make available the feature to the user; and providing the requested feature to the user.

18. A computer program product including instructions embodied on a computer readable medium, the instructions comprising:

transmitting instructions for transmitting a wireless control message within a given environment from a central control computer;

establishing instructions for establishing a wireless communication link between the control computer and a mobile electronic device upon the mobile electronic device entering the environment and receiving the control message;

communicating instructions for communicating instructions from the central control computer to the mobile electronic device to disable one or more of features within the mobile electronic device; and communicating instructions for communicating instructions from the central control computer to the mobile electronic device to provide the mobile electronic device with access to one or more features associated with the central control computer.

19. The computer program product of claim 18, wherein the one or more features associated with the central control computer are selected from a wireless transceiver, a global positioning system, antenna, speaker, microphone, printer, display screen, keyboard, voice response, databases, spreadsheets, computer games, video games, processing power, word processing, maps, directions or combinations thereof and wherein the one or more features are not software downloaded to the mobile electronic device.

20. The computer program product of claim 18, wherein the one or more features associated with the central control computer are substitutes for the one or more disabled features within the mobile electronic device.

21. The computer program product of claim 18, wherein the one or more features associated with the central control computer are enhancements to the mobile electronic device, wherein the enhanceutents provide one or more features not possessed by the mobile electronic device.

22. The computer program product of claim 18, wherein the features within the mobile electronic device are selected from keypad, keyboard, display, speaker, microphone, transceiver, joystick, memory, transmitter, receiver, electronic flash, drivers for peripheral devices, printer, scanner or combinations thereof.

23. The computer program product of claim 18, wherein the features within the mobile electronic device are selected from user input devices, user output devices, transmitter, receiver, memory, transceiver, I/O controller, drivers for peripheral devices or combinations thereof.

24. The computer program product of claim 18, wherein the mobile electronic device is selected from a mobile telephone, a handheld personal computer, a personal organizer, a palmtop computer, a computerized notepad, a global positioning system (GPS), an electronic video cam player, a video player, an MP3 audio player, a personal digital assistant, digital camera, video recorders, audio recorders or combinations thereof.

25. The computer program product of claim 18, wherein the given environment is selected from aircraft, hospital, automobile, museum, library, movie theater, concert hall, stage theater, amusement park, taxi, train, restaurant, sports arena, shopping mall and office building.

26. The computer program product of claim 18, wherein the given environment is defined as the area in which the wireless control message transmission can be received by the mobile electronic device.

27. The computer program product of claim 18, wherein the wireless control message contains requests consisting of a request for information describing the mobile electronic device, a request to provide addresses for the features of the mobile electronic device, a request to provide an address for the mobile electronic device and combinations thereof.

28. The computer program product of claim 18, wherein the address for the mobile electronic device is selected from a pre-assigned address or an address randomly generated by the mobile electronic device at the time the wireless control message is received by the mobile electronic device.

29. The computer program product of claim 18, wherein the step of establishing instructions for establishing a wireless communication link further comprises:

receiving instructions for receiving the wireless control message by the mobile electronic device;

interpreting instructions for interpreting the control message to be an identification request from the central control computer; and transmitting instructions for transmitting a wireless identification message to the central control computer, wherein the wireless identification message contains information describing the mobile electronic device, an address for the mobile electronic device, and an address for each of the features within the electronic device.

30. The computer program product of claim 29, wherein the step of establishing a wireless communication link further comprises:

storing instructions for storing the address for the mobile electronic device, and the address for each of the features within the mobile electronic device;

monitoring instructions for monitoring by the mobile electronic device for messages to the assigned address for the mobile electronic device, and monitoring instructions for monitoring by the central control computer for messages from the assigned address for the mobile electronic device.

31. The computer program product of claim 30, wherein each of the messages to and from the assigned address for the mobile electronic device comprises the address for the mobile electronic device, the address for the one or more features of the mobile electronic device, and instructions for the one or more features of the mobile electronic device to perform.

32. The computer program product of claim 30, wherein the step of providing instructions for providing the mobile electronic device with access to one or more features associated with the central control computer further comprises:

receiving instructions for receiving a message from the mobile electronic device;

comparing instructions for comparing the address for the feature of the mobile electronic device contained in the message with a list of addresses for the features of the mobile electronic device included in the wireless identification message; and instructing instructions for instructing a substitute feature of the central control computer to perform the instruction contained in the message.

33. The computer program product of claim 30, wherein the step of providing instructions for providing the mobile electronic device with access to one or more features associated with the central control computer further comprises:

displaying instructions for displaying a menu of available features to the user;

receiving instructions for receiving a request to make available the feature to the user; and providing instructions for providing the requested feature to the user.

* * * * *